United States Patent [19]

Price et al.

[11] Patent Number: 4,711,327
[45] Date of Patent: Dec. 8, 1987

[54] SELF-ENERGIZING DISC BRAKES

[75] Inventors: Anthony G. Price, Croseyceiliog, Wales; Roy Campbell, Bromsgrove, England; Andrew P. Green, Pontnewydd, Wales

[73] Assignee: Lucas Industries, England

[21] Appl. No.: 895,201

[22] Filed: Aug. 11, 1986

[30] Foreign Application Priority Data

Aug. 30, 1985 [GB] United Kingdom ............... 8521592
Feb. 7, 1986 [GB] United Kingdom ............... 8603106

[51] Int. Cl.⁴ ............................................. F16D 55/04
[52] U.S. Cl. ................................ 188/71.4; 188/72.2
[58] Field of Search ............... 188/71.4, 72.2, 70 B, 188/82.84, 82.8, 136, 140 A, 106 F, 72.7, 72.8, 72.9, 72.6; 192/70, 83, 70.23, 70.24

[56] References Cited

U.S. PATENT DOCUMENTS

| | | | |
|---|---|---|---|
| 2,955,680 | 10/1960 | Caero | 188/70 B |
| 4,383,593 | 5/1983 | Micke | 188/71.4 |
| 4,422,533 | 12/1983 | Price | 188/71.4 |
| 4,508,198 | 4/1985 | Gornall et al. | 188/72.6 X |
| 4,549,636 | 10/1985 | Price et al. | 188/72.2 X |
| 4,653,614 | 3/1987 | Price et al. | 188/72.2 X |

Primary Examiner—Douglas C. Butler
Attorney, Agent, or Firm—Oldham, Oldham & Weber Co.

[57] ABSTRACT

A spreading disc brake is actuated for parking or braking in an emergency by a brake-applying mechanism which comprises a pivotally mounted lever in the form of a bell-crank, and a pull-rod coupled to the lever. The inner end of the pull-rod is provided with an eye of which the inner side of the outermost end has a rocking and sliding engagement with a complementary arcuate face defining a notch in the innermost edge of the longer arm of the lever. The coupling between the pull-rod and the lever enables the pull-rod to adopt a substantially radial alignment with the brake center of rotation, even when brake lining wear progressively increases the brake forward to reverse articulation. The lever is pivotally mounted on one of the pressure plates by a pivot pin, and has a cranked nose which is received within the groove in the other pressure plate. In order to prevent the lever from twisting when the brake is applied, the lever reacts against reaction faces of which the face comprises a wall defining the outer side of the groove, and the face comprises a region on the pressure plate on the radially outermost side of the pin.

7 Claims, 3 Drawing Figures

SELF-ENERGIZING DISC BRAKES

This invention relates to self-energising disc brakes of the kind in which rotatable friction discs provided with linings of friction material are adapted to be brought into engagement with spaced opposed braking surfaces in a housing by pressure plates located between the friction discs and centere by stationary pilot lugs, balls or rollers are located in co-operating oppositely inclined recesses in the adjacent faces of the pressure plates, and the application of the brake is initiated by moving the pressure plates angularly in opposite directions, the pressure plates then moving apart, due to the tendency for the balls or rollers to ride up ramps defined by the edges of the recesses, and into engagement with the friction discs which are urged into engagement with the braking surfaces, and the pressure plates are carried round with the friction discs until one is arrested by the engagement of a lug on the plate with a drag-taking stop abutment in the housing, the continued angular movement of the other pressure plate providing a servo action.

Self-energising brakes of the kind set forth may be dry or they may be of the liquid cooled type, and such brakes are commonly used in tractors and like vehicles and are hereinafter called brakes of the kind set forth.

Self-energising brakes of the kind set forth are adapted to be actuated mechanically by means of a mechanical mechanism, suitably for applying the brake for parking or in an emergency.

In some known constructions the mechanical mechanism comprises a pull-rod which extends into the brake through a radial opening in the housing and at its inner end is coupled to a pivotally mounted lever which is angularly movable in response to movement of the pull-rod in a generally radial direction in order to move the pressure plates angularly relative to each other to initiate application of the brake.

In such known constructions the outer end of the pull-rod is coupled to a pedal, hand-lever or the like through a suitable linkage and the inner end of the pull-rod is coupled to the lever by means of the pivot pin, suitably a transverse pin passing through aligned openings in a bifurcated fitting at the inner end of the pull-rod, and in the portion of the lever itself which is straddled by the fitting and is disposed substantially at the radial mid-point in the lever. As the linings wear progressively, with increase in brake forward to reverse articulation, the pull-rod adopts a progressively increasing non-radial attitude. This, if substantial, will cause the forward to reverse pivotal positions to vary, thereby inducing geometry changes, forward to reverse, which will be displayed as a variation in pedal travel, forward to reverse. It is desirable that such variations are avoided, or at least minimised or reduced, since they are directly experienced by an operator, for example when undertaking brake reversals on gradients.

According to one aspect of our invention in a self-energising disc brake of the kind set forth a mechanical brake-applying mechanism comprises a pull-rod which extends into the brake through a radial opening in the housing and at its inner end is coupled by means of a pivotal coupling to a pivotally mounted lever which is angularly movable in response to movement of the pull-rod in a generally radial direction in order to move the pressure plates angularly relative to each other to initiate application of the brake, and the pivotal coupling comprises a notch in the radially innermost edge of the lever, and a loop in the innermost end of the pull-rod which receives the lever and which has a bearing face having a rocking pivotal engagement with an arcuate face defining the notch.

Arranging the rocking engagement between the pull-rod and the lever substantially at the radially innermost edge of the lever, or substantially at the radially innermost location, has the effect of causing the pull-rod to adopt a substantially radial alignment with the brake center of rotation. It follows that the forward to reverse pull-rod pivoted coupling positions are substantially similar.

The effective centre of rotation for the innermost end of the pull-rod is the centre of a circle containing the instantaneous centre of rotation, therefore the arc defining the notch. This effectively increases the length of the pull-rod thereby optimizing geometry.

The assembly comprising the pull-rod and the lever is simplified since no pivot pin is required between the two members, and the assembly can be assembled simply and without the use of outside agencies, by inserting the end of the lever into the loop and then using a circular motion to cause the faces to be moved into co-operation.

In a preferred construction the lever is pivotally mounted on one of the pressure plates by means of a pivot pin and has a cranked nose which co-operates with the other pressure plate, the reactin on the pivot pin as the lever is moved angularly and the co-operation of the nose with the said other pressure plate urging the pressure plates angularly in opposite directions in response to movement of the pull-rod in a generally radial direction.

To facilitate installation, the lever is cranked in the plane of the lever. It is therefore subjected to an offset load which, in turn, causes a twisting movement which must be restrained.

According to another aspect of our invention in a self-energising disc brake of the kind set forth a brake-applying lever is pivotally mounted on one of the pressure plates by means of a pivot pin and has a cranked nose which co-operates with the other pressure plane, and the lever is restrained from twisting by the co-operation of faces on opposite side of the lever with opposed reaction faces on the two pressure plates which are disposed substantially on diametrically opposite sides of the pivot pin.

Conveniently the nose is received within a groove in the said other of the pressure plates of which the face remote from said one of the pressure plates comprises the reaction face against which the nose reacts, and the lever itself reacts against the reaction face on the said one of the pressure plates comprising a region of that pressure plate on the radially outermost side of the pivot pin.

Providing the cranked nose and the groove in which it is received enables a thickness of metal to remain in the plate between the groove and its outer face, which defines a braking face for engagement with the adjacent friction disc, sufficient to prevent the formation of a 'hot spot' which might cause the plate to crack and otherwise burn through the plate.

It is therefore possible to arrange the contact point on the nose of the lever substantially radially between the pivot pin and the geometric centre of the pressure plates. The faces between the lever and the pressure plates are therefore substantially tangential to the pressure plates so that, for a required input torque, minimum forces are required in the lever. It follows that efficiency is improved, and that stresses are reduced on the lever, the pivot pin, and the contact region between the nose and the pressure plate with which it co-operates.

Reacting the lever between opposed faces on the pressure plates reduces the load applied to the pivot pin. This in turn, enables us to reduce the cost of the pivot pin itself.

The reaction face on the said one pressure plate against which the lever reacts may comprise a spot face on a boss and the remainder of the surface of the boss can be left unmachined.

One embodiment of our invention is illustrated in the accompanying drawings in which.

Figure 1:
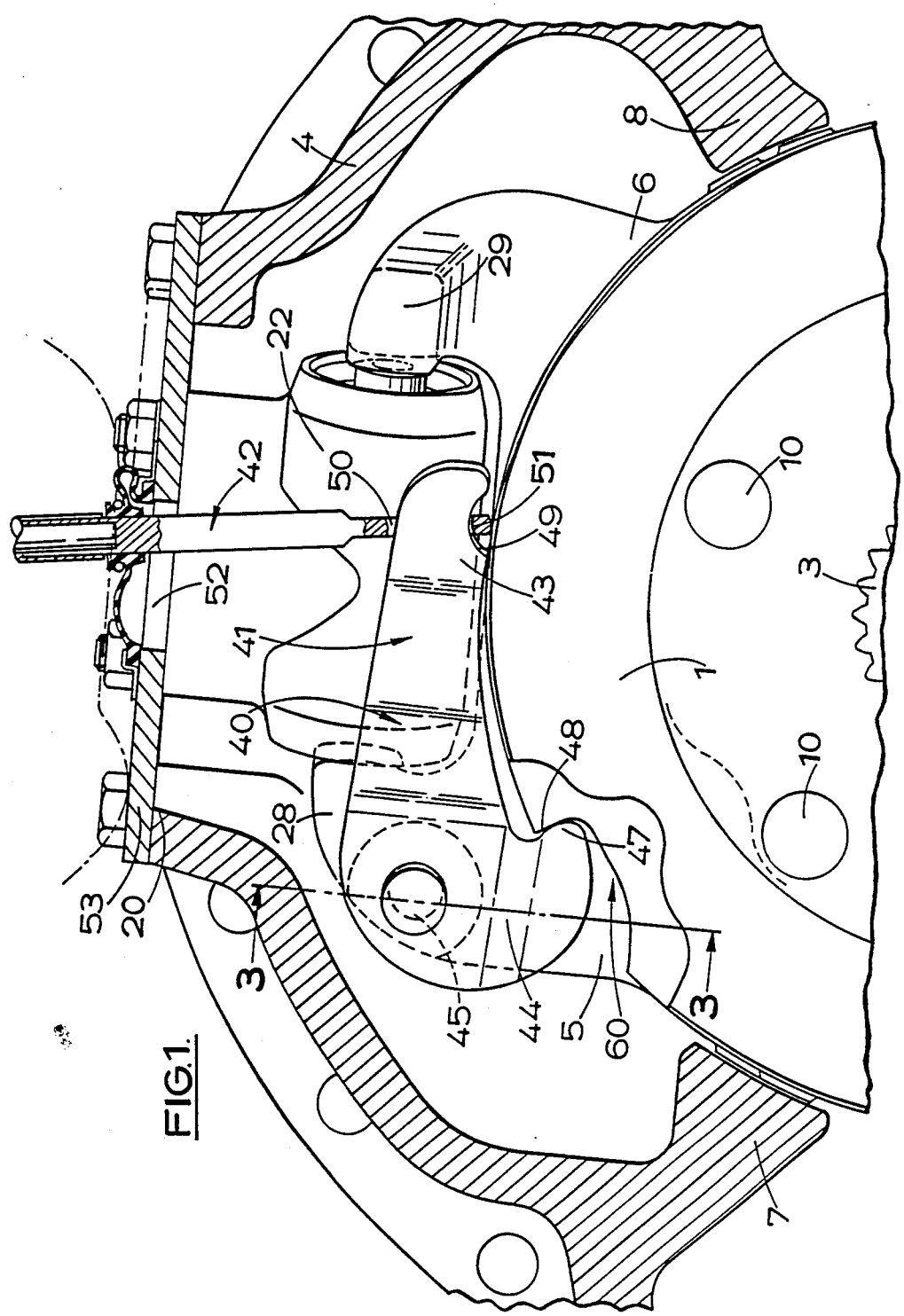
FIG. 1 is an end view of a portion of a spreading brake.
Figure 2:
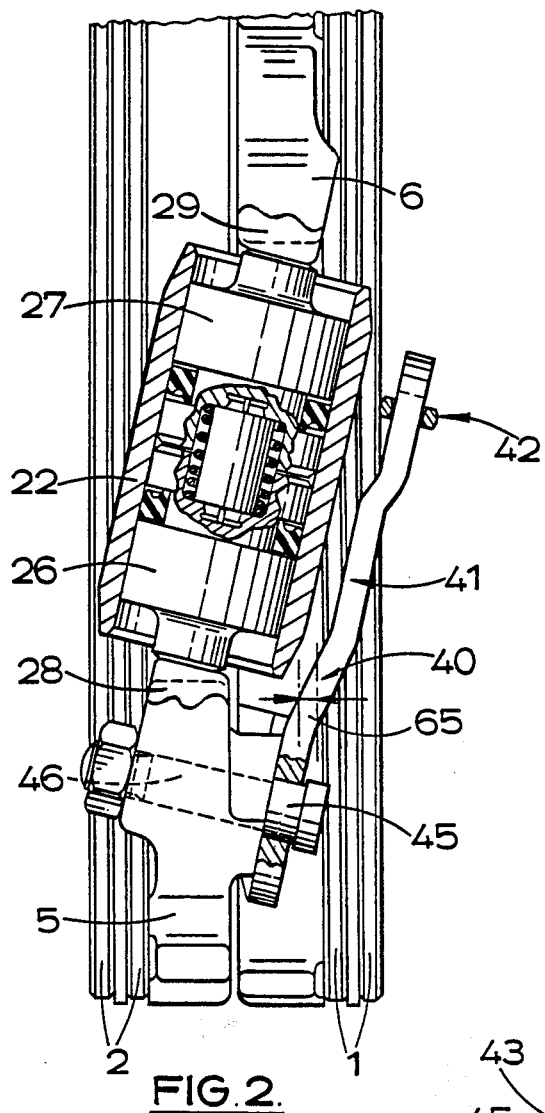
FIG. 2 is a plan view of the same including a section through an hydraulic actuator and with the housing omitted for clarity.
Figure 3:
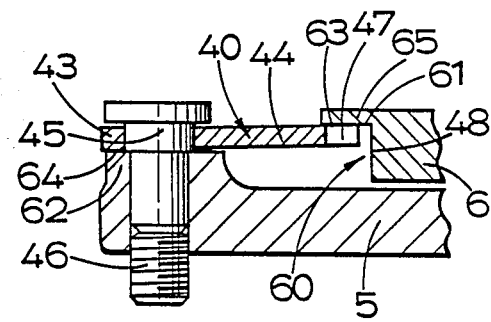
FIG. 3 is a section on the line 3—3 of FIG. 1.

The brake illustrated in the drawings is of a conventional spreading type in which two rotatable friction discs 1, 2 provided with friction linings and splined on a shaft 3 are adapted to be brought into engagement with spaced opposed radial braking surfaces in a housing 4 by pressure plates 5, 6 located between the discs 1 and centred by three angularly spaced stationary pilots of which only two are shown at 7 and 8. Balls 10 are located in co-operating oppositely inclined recesses in the adjacent faces of the pressure plates 5, 6.

The application of the brake is initiated by moving the pressure plates 5, 6 angularly in opposite directions which causes the pressure plates 5, 6 to move axially relatively away from each othere due to the tendency for the balls 10 to ride up ramps defined by the end faces of the recesses. This urges the friction discs 1, 2 into engagement with the opposed braking faces in the housing 4. The pressure plates 5, 6 are then carried round with the discs 1, 2 until one is arrested by the engagement of a lug on a respective plate 5, 6 with a drag-taking abutment constituted by the pilot (not shown), whereafter continued angular movement of the other plate provides a servo action.

A radial opening 20 in the housing 4 provides a mounting for an hydraulic actuator 22 by means of which the brake is adapted to be applied hydraulically.

The hydraulic actuator 22 conveniently forms the subject of our co-pending patent application No. 8506163 and need not be described further except for stating that the actuator 22 has an open-ended longitudinal through-bore in which work a pair of oppositely acting pistons 26, 27 for engagement with lugs 28, 29 on the plates 5, 6.

A mechanical brake-applying mechanism 40 is provided for applying the brake manually for parking or in an emergency. As illustrated the mechanism 40 comprises a lever 41 in the form of a bell-crank, and a pull-rod 42 coupled to the lever 41. The bell-crank lies in a plane substantially parallel to the direction of relative movement of the two pressure plates 5, 6 at the position on the plates at which the lever 41 is mounted.

The lever 41 has a longer arm 43 and a shorter arm 44 and is pivotally connected to the lug 28 by means of a pivot pin 45 comprising a portion of increased diameter on the shank of a bolt 46 which passes through an opening in the lug 28.

The shorter arm 44 extends in a generally radially inward direction and is provided with a curved nose 47 which has a rolling engagement with a radial face 48 on the pressure plate 6.

The longer arm 43 extends in a generally circumferential direction and adjacent to its free end a notch 49 of arcuate outline is provided in the radially innermost edge of the lever 40. The arm 43 is cranked in the plane of the arm to facilitate installation.

The pull-rod 42 is provided at its inner end with a loop 50 in the form of an eye which encircles the free end of the arm 43. A bearing face 51 of arcuate outline comprising the inner side of the outermost end of the loop 50 has a rocking and sliding engagement with a complementary arcuate face defining the notch 49.

To attach the pull-rod 42 to the lever 41 the loop 50 is offered to the free end of the arm 43 and the pull-rod 42 is then moved substantially in the plane of the lever 41 using a circular motion and in a a counter-clockwise direction with reference to FIG. 1 of the drawings. Dis-assembly of the loop 50 from the arm is impossible when the pull-rod 42 and the lever 41 are assembled in the brake due to the limited circumferential length of an opening 52 which is chosen to restrict such a circular motion. The opening 52 is provided in a plate 53 which is bolted over the opening 20 and through which the pull-rod 42 extends into the brake in a generally radial direction.

When the brake is to be applied by the mechanism 40, the pull-rod 42 is withdrawn relatively from the housing in a generally radial direction to urge the lever 41 angularly about the pin 45 as a pivot. This is achieved by a pedal, hand-lever or the like operating on the lever 41 through a suitable linkage. The nose 47 acts on the face 48 to urge the plate 6 in one direction, and the reaction on the pin 45 acts to urge the plate 5 in the opposite direction. Relative angular movement between the plates 5, 6 in opposite directions initiates application of the brake as described above.

The arrangement of the pivotal connection between the pull-rod 42 and the lever 41, and specifically the rocking and sliding engagement, enables the pull-rod 42 to adopt a substantially radial alignment with the brake centre of rotation, even when brake lining wear progressively increases the brake forward to reverse articulation.

A groove 60 is provided in the inner face of the pressure plate 6 which is adjacent to the pressure plate 5. The wall at the circumferentially innermost face of the groove 60 defines the radial face 48, and the outer face of the pressure plate 6 is continuous to define a wall 61. A thickness of metal indicated at 65 is therefore provided between the groove 60 and the braking face defined by the outer face of the pressure plate 6.

The pivot pin 45 is clamped against a raised boss 62 on the pressure plate 5.

In order to prevent the lever 40 from twisting when the brake is applied mechanically, the lever 40 reacts against reaction faces 63 and 64 disposed substantially at diametrically opposed positions on opposite sides of the pivot pin 45. As illustrated the reaction faces 63 and 64 comprise the inner face of the wall 61 against which the shorter arm 44 reacts, and a boss 62. The pivot pin 45 abuts against a spot face on the boss 62, and the lever 40 abuts against a region on the boss which may be unmachined if the boss, itself, is not completely machined.

Since the lever 40 lies in a plane which is parallel to the place containing the ramps, the reaction faces 63 and 64 will remain substantially parallel when the brake is applied mechanically, providing the best possible restraint for the lever 40.

In a modification in which the lever lies in a plane normal to the axis of the brake the faces 63 and 64 will move relatively apart, giving less accurate restraint for the lever 40 when the brake is applied.

We claim:

1. A self-energising disc brake comprising a housing, first and second axially spaced braking surfaces in said housing, radial pilot lugs and a drag-taking stop abutment in said housing, first and second pressure plates centred on said pilot lugs, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material for engagement with said pressure plate and said braking surface carried by opposite faces of said discs, and means for moving said pressure plates angularly relative to said housing to initiate application of said brake with said pressure plates also moving axially to urge the friction members into engagement with said braking surfaces due to a tendency for said rolling bodies to ride up ramps defined by said end faces and constituting camming means, said plates being carried round with said discs until one of said plates is arrested by the engagement of a lug on that plate with said drag-taking stop abutment, whereafter continued angular movement of the other of said plates provides a servo action, wherein a mechanical brake-applying mechanism comprises a pull-rod which extends into said brake through a radial opening in said housing, said pull-rod having an inner end, a pivotally mounted lever having a radially innermost edge, a pivotal coupling for coupling said inner end to said lever, said lever being angularly movable in response to movement of said pull-rod in a generally radial direction in order to move said pressure plates angularly relative to each other to initiate application of the brake, and said coupling comprises an arcuate face defining a notch in said radially innermost edge of said lever, and a loop in said inner end of the pull-rod which receives said lever and which has a bearing face having a rocking pivotal enagement with said arcuate face defining said notch.

2. A brake as claimed in claim 1, including a pivot pin, wherein said lever is pivotally mounted on one of said pressure plates by means of said pivot pin and has a cranked nose which co-operates with the other of said pressure plates, the reaction on said pivot pin as said lever is moved angularly and the co-operation of said nose with the said other pressure plate urging said pressure plates angularly in opposite directions in response to movement of said pull-rod in a generally radial direction.

3. A brake as claimed in claim 1, wherein said lever is cranked in the plane of said lever.

4. A brake as claimed in any claim 1, wherein said radial opening has a circumferential length chosen to limit relative movement between said rod and said lever in a circumferential direction by an amount sufficient to prevent separation of said loop from said lever.

5. A self-energising disc brake comprising a housing, first and second axially spaced braking surfaces in said housing, radial pilot lugs and a drag-taking stop abutment in said housing, first and second pressure plates centred on said pilot lugs, adjacent faces of said pressure plates being provided with co-operating oppositely inclined angularly spaced recesses, rolling bodies located in complementary pairs of said recesses, a rotatable friction member disposed between each said pressure plate and an adjacent said braking surfaces, each said member comprising a disc, and first and second linings of friction material for engagement with said pressure plate and said braking surface carried by opposite faces of said discs, and means for moving said pressure plates angularly relative to said housing to initiate application of said brake with said pressure plates also moving axially to urge the friction members into engagement with said braking surfaces due to a tendency for said rolling bodies to ride up ramps defined by said end faces and constituting camming means, said plates being carried round with said discs until one of said plates is arrested by the engagement of a lug on that plate with said drag-taking stop abutment, whereafter continued angular movement of the other of said plates provides a servo action, wherein a pivot pin pivotally mounts a brake-applying lever on one of said pressure plates and said lever has a cranked nose which co-operates with the other of said pressure plates, a reaction face being provided on each said pressure plate, with said reaction faces disposed on opposite sides of said pivot pin, and wherein said lever is restrained from twisting by the co-operation of faces on opposite side of said lever with said opposed reaction faces on said pressure plates.

6. A brake as claimed in claim 5, wherein the nose is received within a groove in the said other of the pressure plates of which a said face remote from said one of the pressure plates comprises said reaction face against which said nose reacts, and said lever itself reacts against said reaction face on the said one of said pressure plates comprising a region of said pressure plate on the radially outermost side of said pivot pin.

7. A brake as claimed in claim 5, wherein said reaction face on the said one pressure plate against which said lever reacts comprises a spot face on a boss.

* * * * *

UNITED STATES PATENT AND TRADEMARK OFFICE
CERTIFICATE OF CORRECTION

PATENT NO. : 4,711,327

DATED : December 8, 1987

INVENTOR(S) : Anthony G. Price et al

It is certified that error appears in the above-identified patent and that said Letters Patent is hereby corrected as shown below:

On the title page assignee should read

--(73)Assignee: Lucas Industries public limited company --.

Signed and Sealed this

Twentieth Day of June, 1989

Attest:

DONALD J. QUIGG

Attesting Officer

Commissioner of Patents and Trademarks